United States Patent [19]

Fukuda

[11] Patent Number: 4,556,304
[45] Date of Patent: Dec. 3, 1985

[54] AUTOFOCUS CAMERA INCLUDING A COVER FOR A TAKING LENS AND DIAGONALLY DISPOSED RANGE FINDER WINDOWS

[75] Inventor: Hiroshi Fukuda, Tokyo, Japan

[73] Assignee: Fuji Photo Film Co., Ltd., Kanagawa, Japan

[21] Appl. No.: 656,910

[22] Filed: Oct. 2, 1984

[30] Foreign Application Priority Data

Oct. 3, 1983 [JP] Japan ............... 58-152038[U]

[51] Int. Cl.⁴ .................... G03B 3/00; G03B 17/02
[52] U.S. Cl. ................................ 354/288; 354/162; 354/403
[58] Field of Search ............ 354/162, 166, 187, 202, 354/288, 402, 403, 408

[56] References Cited

U.S. PATENT DOCUMENTS

| | | | |
|---|---|---|---|
| 3,836,985 | 9/1974 | Lange | 354/288 |
| 4,032,940 | 6/1977 | Chan | 354/288 |
| 4,299,465 | 11/1981 | Chan | 354/187 |
| 4,432,621 | 2/1984 | Suzuki et al. | 354/403 |

FOREIGN PATENT DOCUMENTS 870941 2/1953 Fed. Rep. of Germany ...... 354/288
57-173822 10/1982 Japan ..................... 354/288

*Primary Examiner*—A. A. Mathews
*Attorney, Agent, or Firm*—Young & Thompson

[57] ABSTRACT

At least two rangefinder windows for measuring by triangulation the distance to the object to be photographed, are disposed opposite each other around a taking lens in diagonally upper and lower positions, on the front face of the camera body. A protective cover is provided, in the shape generally of a parallelogram slanted in the direction of a line passing through the rangefinder windows. The protective cover shelters the taking lens and the rangefinder windows when the protective cover is closed. When the protective cover is slid along the camera body and moved to its open position, the rangefinder windows and the taking lens are exposed. The protective cover can thus be made narrower, and need move less distance, and the camera body can be made correspondingly horizontally shorter, than if the protective cover were rectangular.

7 Claims, 5 Drawing Figures

4,556,304

AUTOFOCUS CAMERA INCLUDING A COVER FOR A TAKING LENS AND DIAGONALLY DISPOSED RANGE FINDER WINDOWS

BACKGROUND OF THE INVENTION

The present invention relates to an autofocus camera, and more particularly, it relates to a camera with a protective cover sheltering a taking lens and a number of rangefinder windows when the camera is not in use.

Autofocus cameras detecting distance by triangulation are widely known. The triangulation-type rangefinders are mainly either of active type or of passive type depending upon whether they have a light-emitting device. Both types have at least two rangefinder windows mounted on the front face of the camera.

In the active-type rangefinder, a light-emitting device for radiating near-infrared light is disposed in one rangefinder window, and a light-receiving device for detecting near-infrared light is disposed in the other rangefinder window. The distance to the object to be photographed is measured by detecting light reflected by the object while scanning the light-emitting device. An improved version of such an active-type rangefinder is also known, in which a light-receiving device is constructed of a plurality of light-receiving elements. With this arrangement, the distance to the object to be photographed is measured by detecting which light-receiving element has received the near-infrared light radiated from the light-emitting device and reflected by the object.

In the passive-type rangefinder, light-receiving element arrays are mounted one in each of the two rangefinder windows, and the distance to the object to be photographed is measured by detecting whether images obtained on the two light-receiving element arrays are the same or not. The passive-type rangefinder has one form in which a CCD (Charge Coupled Device) linear array is used as the light-receiving element array and another form in which a scanning mirror is disposed in front of one of the light-receiving element arrays.

It is known in the case of triangulation-type rangefinders that the longer the base length between two rangefinder windows, the greater the precision of distance detection. For compact cameras, in order to make the camera body look small, a vertical length of the camera (height) viewed from the front is made lss. Therefore, a sufficient base length is not obtained even when the rangefinder windows are spaced apart in a vertical direction. Since the horizontal length of the camera body is very great compared with the height, it may be possible to obtain a sufficient base length by horizontally spacing apart the rangefinder windows. However, in this case, a problem arises when, instead of a leather case, a protective cover is slidably mounted on the camera body. In such a case, when the camera is not used, the protective cover is slid to a closed position to shelter the taking lens, the viewfinder, the rangefinder windows, and the like. However, as described above, if a plurality of rangefinder windows are spaced apart horizontally along the camera body, the protective cover becomes unduly large, and as a result, the amount of sliding movement of the protective cover, between open and closed positions, also becomes unduly great.

SUMMARY OF THE INVENTION

It is, therefore, a principal object of the present invention to provide an autofocus camera which provides a sufficient base length for a rangefinder.

It is another object of the present invention to provide an autofocus camera which can completely shelter a taking lens and rangefinder windows with a protective cover which is small in size and in range of movement.

Finally, it is an object of the present invention to provide an autofocus camera which can measure distance with high precision, with small parallax, by disposing a plurality of rangefinder windows opposite to each other around the taking lens.

In order to achieve the above and other objects, the present invention provides at least two rangefinder windows opposite to each other around the taking lens at diagonally upper and lower positions respectively so as to ensure a sufficient base length, the protective cover being of a parallelogram shape with its two upright side edges inclined.

DETAILED DESCRIPTION OF THE INVENTION

Figure 1:
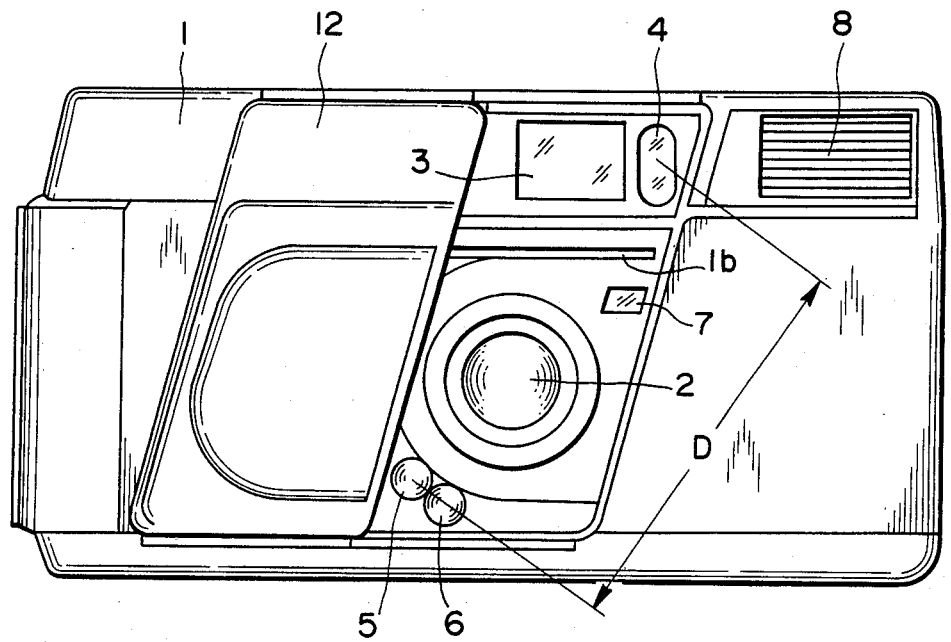
FIG. 1 is a front view of an embodiment of the autofocus camera according to the present invention with protective cover open.

Referring now to FIG. 1, a camera body 1 has on its front face a taking lens 2, a viewfinder 3, rangefinder windows 4 through 6, a light-sensing window 7 for measuring the brightness of the object to be photographed, and a flash unit 8. The rangefinder window 4 accommodates a lens and a light-emitting device which is actuated during the rangefinding mode during which a release button 9 mounted on the top face of the camera body 1 is hald depressed. During the rangefinding mode, near-infrared light forming a spot and turning on and off is radiated toward the object to be photographed. The rangefinder window 5 has a lens directed toward a near-distance zone and a first light sensor which receives, if the object to be photographed is present within the near-distance zone, near-infrared light reflected by the object. The rangefinder window 6 has a lens directed toward a far-distance zone and a second light sensor which receives, if the object to be photographed is present within the far-distance zone, near-infrared light reflected by the object.

The active-type distance detector, and an autofocus device comprising a rangefinder and a shift mechanism for the taking lens 2 are widely known in the art and are not the gist of the present invention; so the disclosure of their construction is here omitted and only the principle thereof will briefly be discussed.

In the rangefinding mode, whether an object to be photographed is present within a near-distance zone or a far-distance zone is judged by comparing the outputs of the first and second light sensors. For example, if the output from the first light sensor is greater than that from the second light sensor, the object to be photographed is judged to be present within the near-distance zone. In the opposite case, the object is judged to be present within the far-distance zone. If both outputs from the first and second light sensors are lower than a predetermined value, the object to be photographed is judged to be present in an infinite-distance zone. Depending on this judgment, the shift mechanism is controlled and the position of the taking lens 2 is adjusted to take one of the three preset positions.

The rangefinder windows 5 and 6 are disposed adjacent to each other and symmetrically on opposite sides of a line passing through the centers of the taking lens 2 and the rangefinder window 4. Since the rangefinder window 4 and the distance detector windows 5 and 6 are disposed opposite to each other around the taking lens 2, the parallax between the taking lens 2 and the autofocus device is small. As the rangefinder windows 4–6 are disposed opposite to one another around the taking lens 2 at diagonally upper and lower positions, the base length D is substantially longer than when the rangefinder windows are disposed vertically.

A protective cover 12 made of plastic is disposed slidably in a lateral direction and on the front face of the camera body 1. The protective cover 12 is L-shaped in section (see FIG. 4), and the front configuration thereof is a parallelogram, specifically a trapezoid, slanted toward a line passing through the rangefinder window 4 and the rangefinder window 5 or 6.

Figure 4:
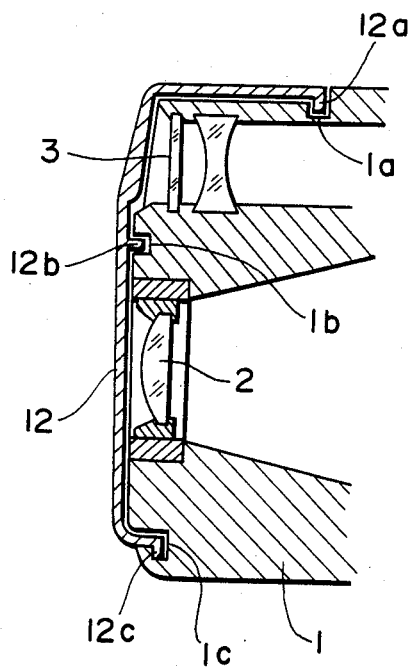
FIG. 4 is a cross sectional view showing the mounting of the protective cover on the camera body.

As shown in FIG. 4, the protective cover 12 is formed with projections 12a through 12c at opposite ends and at a generally middle portion. The projections 12a through 12c are engaged with and securely guided by guide grooves 1a through 1c formed on the camera body 1.

Figure 2:
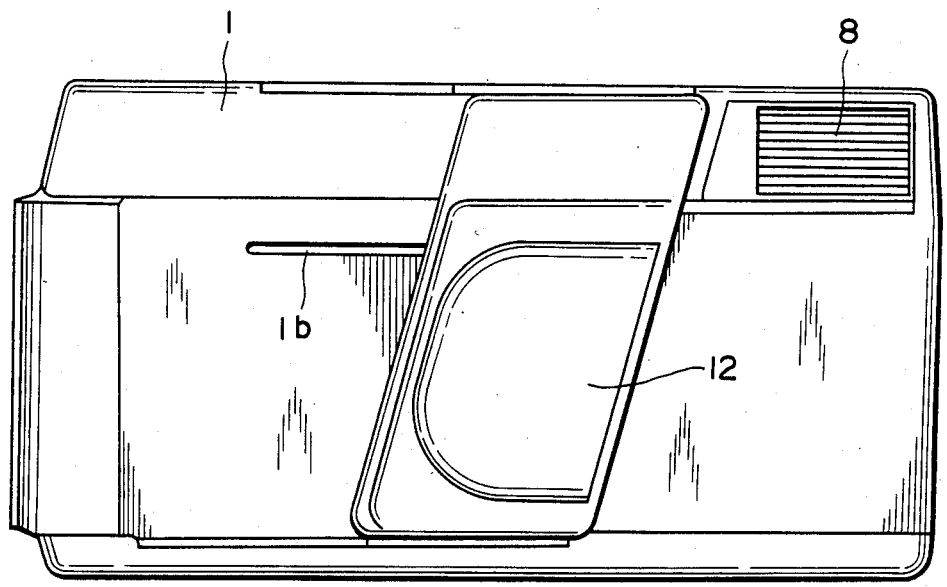
FIG. 2 is a front view similar to FIG. 1 in which the protective cover is closed.
Figure 3:
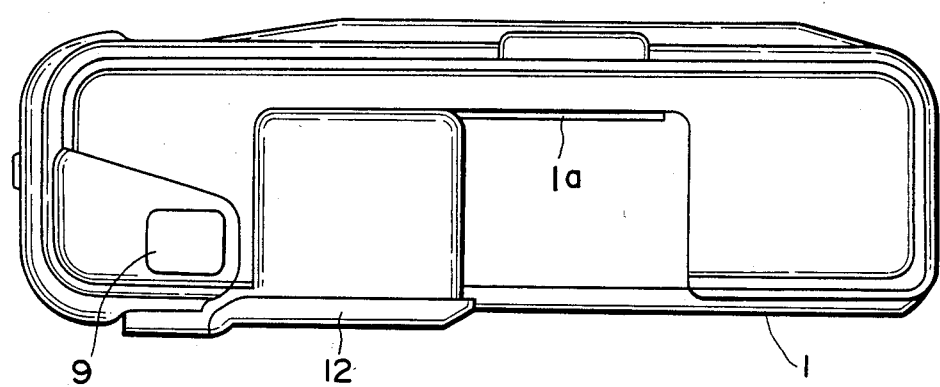
FIG. 3 is a top plan view of the autofocus camera with the protective cover open.

As shown in FIG. 1, when the protective cover 12 is open, the taking lens 2, viewfinder 3, rangefinder windows 4 through 6, and light sensing window 7 are exposed. In this condition, the camera may be used. After finishing photographing, the protective cover 12 is slid to the right and is returned to a closed position as shown in FIG. 2, in which the protective cover 12 shelters the taking lens 2, viewfinder 3, rangefinder windows 4 through 6, and light sensing window 7, and prevents these members from being scratched or becoming dusty.

Figure 5:
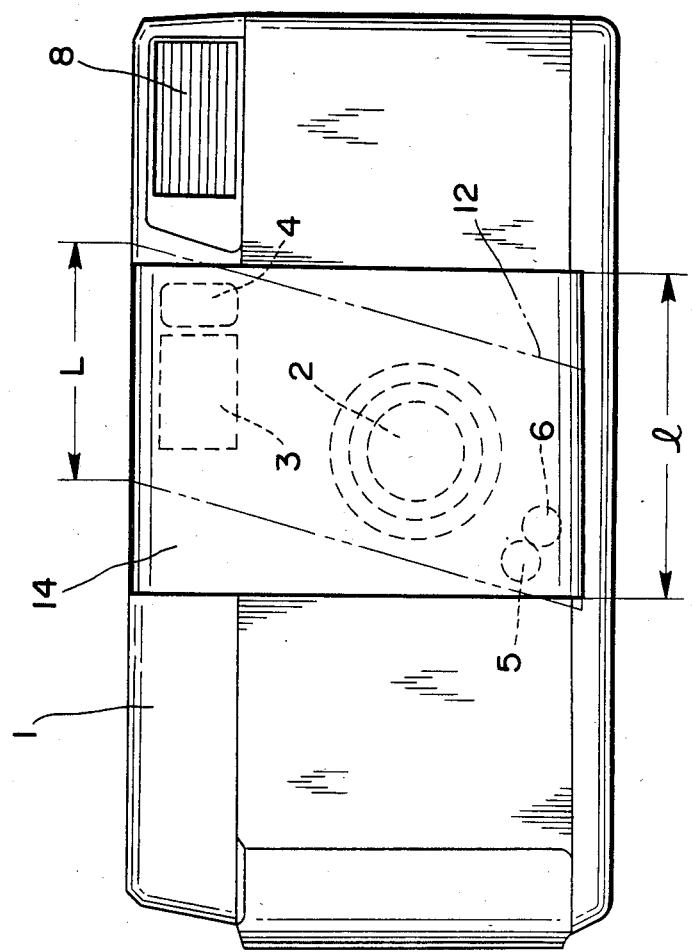
FIG. 5 is a front view illustrating the benefits gained by the present invention.

FIG. 5 shows a construction that is not within and so does not enjoy the benefits of the present invention. If the front configuration of a protective cover 14 sheltering the rangefinder windows 4 through 6 were made to have a rectangular shape, the lateral length l would become unduly great. And in order to slide the protective cover 14 to the open position, the necessary movement l would also be unduly long. But by using the protective cover 12 of the present invention which is shown in phantom line in FIG. 5, the lateral length is only L (L<l), so that the area of the protective cover 12 can be made desirably small and the path of movement can be made desirably shorter.

In the above embodiment, two rangefinder windows accommodating light sensors have been used. However, it is also possible to use more light sensors thereby making it possible to effect multi-step rangefinding. Furthermore, in the above embodiment, an active-type rangefinder has been used. However, it may also be possible to use a passive-type rangefinder.

It will further be understood by those skilled in the art that the foregoing description is of a preferred embodiment of the disclosed device and that various changes and modifications may be made in the invention without departing from the spirit and scope thereof.

What is claimed is:

1. An autofocus camera having a camera body and on the front face of the camera body having a taking lens and at least two rangefinder windows for measuring the distance to the object to be photographed, the rangefinder windows being disposed on opposite sides of the taking lens in diagonally upper and lower positions, and a protective cover disposed slidably on said camera body for sliding movement between open and closed positions, the cover having an edge that is slanted toward the direction of a line passing through said oppositely disposed rangefinder windows, said protective cover sheltering said rangefinder windows and said taking lens when closed and retreating from and exposing said taking lens and said rangefinder windows when open, said edge passing over said lens and windows during opening and closing movement of said cover.

2. A camera as claimed in claim 1, wherein said protective cover has a portion in front of said camera body that is of generally parallelogram shape.

3. A camera as claimed in claim 2, in which said parallelogram is a trapezoid.

4. A camera as claimed in claim 1, and a viewfinder mounted on said camera body for viewing the object to be photographed, said viewfinder being disposed above said taking lens in a position wherein said viewfinder is sheltered or exposed by said protective cover.

5. A camera according to claim 1, wherein said protective cover has a cross sectional profile which is substantially L-shaped and that interfits with the front and top faces of said camera body.

6. A camera as claimed in claim 5, wherein projections extending along the sliding direction of said protective cover are formed on opposite side portions of said protective cover, and said projections are slidably engaged within guide grooves on said camera body.

7. A camera as claimed in claim 1, wherein said at least two rangefinder windows comprise a light-transmitting window for radiating a spot of light toward the object to be photographed, and at least one light-receiving window for receiving light reflected by said object.

* * * * *